(12) United States Patent
Ravichandran et al.

(10) Patent No.: US 12,406,469 B1
(45) Date of Patent: Sep. 2, 2025

(54) CLASS-INCREMENTAL LEARNING WITH PRETRAINED MACHINE LEARNING MODELS

(71) Applicant: Amazon Technologies, Inc., Seattle, WA (US)

(72) Inventors: Avinash Aghoram Ravichandran, Seattle, WA (US); Pashmeen Mistry, San Jose, CA (US); Tz-Ying Wu, San Diego, CA (US); Gurumurthy Swaminathan, Redmond, WA (US); Zhizhong Li, Seattle, WA (US); Rahul Bhotika, Bellevue, WA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 419 days.

(21) Appl. No.: 17/951,887

(22) Filed: Sep. 23, 2022

(51) Int. Cl.
| | |
|---|---|
| *G06V 10/764* | (2022.01) |
| *G06V 10/774* | (2022.01) |
| *G06V 10/80* | (2022.01) |
| *G06V 20/70* | (2022.01) |

(52) U.S. Cl.
CPC .......... *G06V 10/764* (2022.01); *G06V 10/774* (2022.01); *G06V 10/809* (2022.01); *G06V 20/70* (2022.01)

(58) Field of Classification Search
CPC .. G06V 10/764; G06V 10/774; G06V 10/809; G06V 20/70
See application file for complete search history.

(56) References Cited

U.S. PATENT DOCUMENTS

| | | | |
|---|---|---|---|
| 9,805,264 B2* | 10/2017 | Kuznetsova | ........ G06F 18/2132 |
| 10,860,836 B1* | 12/2020 | Tyagi | ...................... G06N 3/084 |
| 10,878,296 B2* | 12/2020 | Murphy | ................. G06N 20/00 |
| 10,878,320 B2* | 12/2020 | Wierzynski | ............ G06V 10/82 |
| 11,120,306 B2* | 9/2021 | Desai | ........................ G06T 7/70 |
| 11,250,296 B2* | 2/2022 | Brower | .............. G06F 18/2148 |
| 11,436,849 B2* | 9/2022 | Zilberman | ....... G06V 30/19173 |
| 11,513,670 B2* | 11/2022 | Singh | ...................... G06F 17/18 |
| 11,586,989 B2* | 2/2023 | Bos | ........................ G06N 20/20 |
| 11,836,994 B2* | 12/2023 | Saggu | ....................... G06T 7/74 |
| 11,908,174 B2* | 2/2024 | Bedez | ..................... G06T 11/00 |
| 12,013,922 B2* | 6/2024 | Michiels | ................... G06T 3/40 |

OTHER PUBLICATIONS

Wu et al., "Class-Incremental Learning with Strong Pre-trained Models", Proceedings of the IEEE/CVF Conference on Computer Vision and Pattern Recognition (CVPR), Apr. 7, 2022, pp. 9601-9610.

* cited by examiner

*Primary Examiner* — Gregory M Desire
(74) *Attorney, Agent, or Firm* — Nicholson De Vos Webster & Elliott LLP

(57) ABSTRACT

Techniques for class-incremental learning with pretrained machine learning models are described. According to some examples, a pretrained machine learning model that is capable of recognizing objects belonging to a set of object classes is extended to add capability for recognizing additional object classes, without significantly reducing the accuracy of the model for recognizing objects belonging to any of the object classes in the original set of object classes (aka catastrophic forgetting).

20 Claims, 12 Drawing Sheets

CLASS-INCREMENTAL LEARNING WITH PRETRAINED MACHINE LEARNING MODELS

BACKGROUND

Enterprises are generating and using more data than ever before. Trying to determine what data is relevant from that data is a non-trivial task. The data may include images, such as scanned documents. Traditional solutions may rely on extracting data from images through manual data entry that is slow and expensive or through simple optical character recognition (OCR) techniques that requires manual customization or configuration.

BRIEF DESCRIPTION OF DRAWINGS

Various examples in accordance with the present disclosure will be described with reference to the drawings, in which.

DETAILED DESCRIPTION

Figure 1:
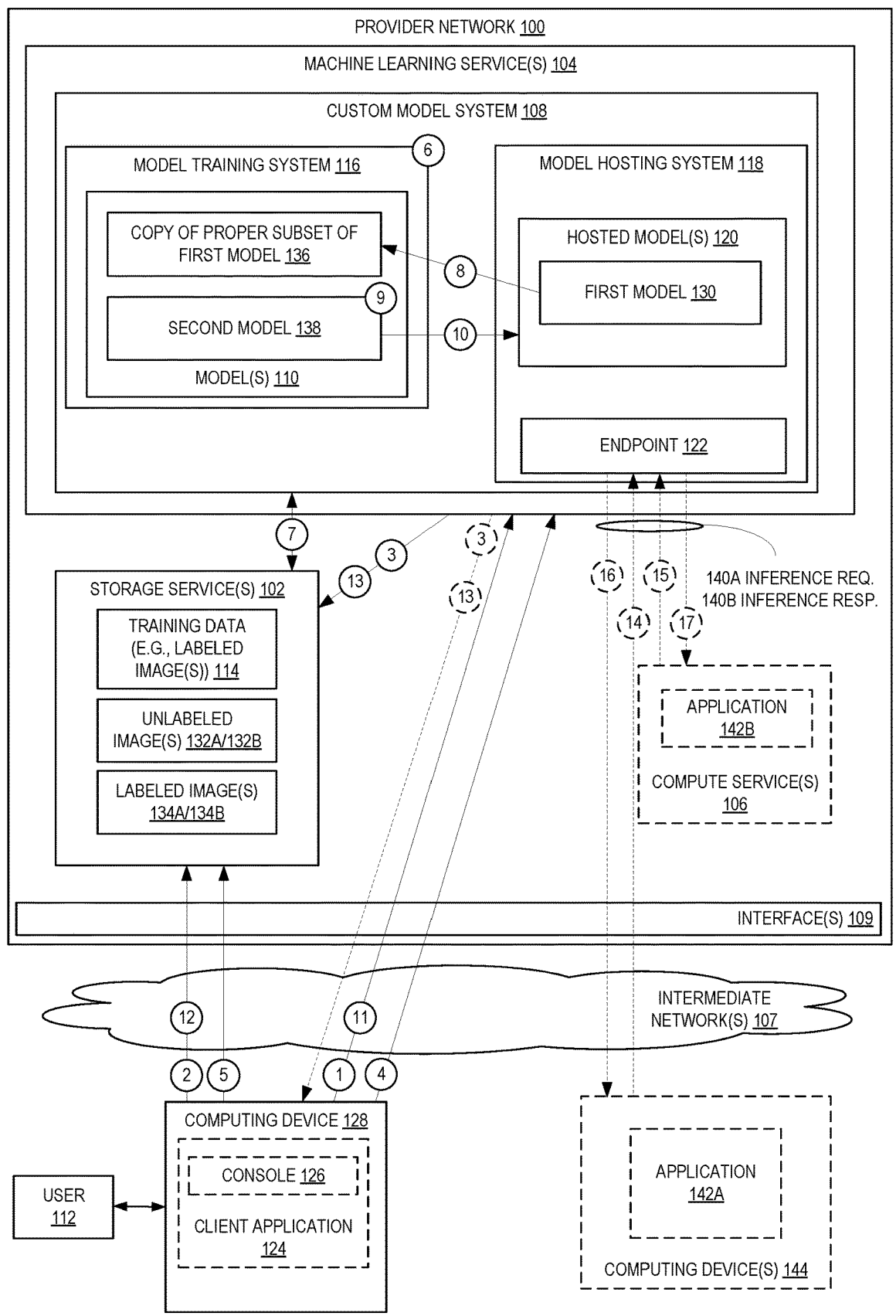
FIG. 1 is a system diagram illustrating an environment for class-incremental learning with pretrained machine learning models according to some examples.

The present disclosure relates to class-incremental learning with pretrained machine learning models. According to some examples, a pretrained machine learning model that is capable of recognizing objects belonging to a set of object classes is extended to add capability for recognizing additional object classes, without significantly reducing the accuracy of the model for recognizing objects belonging to any of the object classes in the original set of object classes.

Services (e.g., cloud-based software as a service (SaaS)) that offer image and video analysis with machine learning (ML) enable customers to use pretrained computer vision application programming interfaces (APIs) without building ML models and infrastructure from scratch. For example, a customer may use a model from a pretrained service that can identify and/or label dogs and cats in images the customer provides. The customer provides the images as input to the pretrained model, and the pretrained model produces as output a set of images that are labeled according to whether any dogs and/or cats are depicted in each image.

Some services offer customizable APIs for situations where a pretrained model for identifying a particular object class is not available. For example, a customer may desire to use a pretrained model to identify and/or label dogs, cats, and elephants in images the customer provides. If a pretrained model for identifying dogs and cats is available, but no pretrained model for identifying elephants is available, then the customer may build a custom model. Current techniques for doing so, however, present several technical problems.

First, the customer may build a new model from scratch that is capable of identifying and/or labeling all three object classes: dogs, cats, and elephants. Doing so, however, is time consuming and expensive.

Second, the customer may build a new model from scratch that is capable of identifying and/or labeling only elephants. Building a new model that recognizes only a single object class might be less time consuming and expensive than building a new model that recognizes all three desired object classes, but it is still time consuming and expensive. Furthermore, this technique results in two separate models, one that recognizes only dogs and cats, and one that recognizes only elephants. To use the models to identify and/or label images that may contain all three object classes, the customer must provide the images separately to both models, which is inconvenient and results in two separate outputs: a first output with labeled images of dogs and cats, and a second output with labeled images of elephants. And, combining outputs from two models is non-trivial and leads to sub-optimal classification accuracies. This is because the pretrained model (in this case, the dogs and cats model) has not seen the data used to train the new model (in this case, the elephants model), and the new model has not seen the data used to train the pretrained model. Deep learning models typically do not provide good estimates on unseen data as opposed to seen data.

Third, the customer may retrain the pretrained model (the dogs and cats model) using training data for the new object class (elephants) to build a new model that is capable of identifying and/or labeling all three desired object classes (dogs, cats, and elephants). This technique has the advantage of speeding up (and lowering the cost of) training, but it significantly reduces the performance of the model with respect to the old object classes due to catastrophic forgetting for the old object classes.

Some of the present embodiments solve these technical problems by starting with a strong (well-trained), knowledgeable, deploy-ready model, keeping the old model as-is, and adding a new branch at a layer near the top to compute scores for new object classes. This solution ensures the output scores for old object classes do not change, and the model only needs to learn how to distinguish between old and new object classes, as well as among new ones. Some embodiments train the new branch fully on the new data, and add a small fusion component to merge the outputs from the branches and distinguish between old and new embodiments. Experimental results have shown that the accuracy of the resulting model is high for both old and new object classes.

In some embodiments, after the new model has been trained, it can be deployed (e.g., hosted at the provider network where it was trained) and accessed via a single API. Thus, for example, when the customer wants to use the new model to label images with multiple object classes, including the newly trained object class (e.g., dogs, cats, and elephants), the customer can access the new model via a single API, provide a set of images for labeling via the single API, and receive a single output from the new model, where the single output includes a set of images with all desired object classes accurately labeled.

In some use cases, a customer may not need a pretrained model to recognize a new object class, but the customer may instead be dissatisfied with the accuracy of the pretrained model to detect one or more supported object classes (e.g., cats and dogs). In some embodiments, such a customer can upload a set of test images to determine model accuracy. If the accuracy is unsatisfactory, the customer can provide (e.g., upload) training images for selected labels for which accuracy is to be improved. The pretrained model can be retrained using the customer-provided images, and the retrained model can be made available via a custom API for that customer.

FIG. 1 illustrates an environment for class-incremental learning with pretrained models according to some examples. FIG. 1 includes one or more storage services 102, one or more machine learning services 104, and one or more compute services 106 implemented within a multi-tenant provider network 100. Each of the services 102, 104, 106 may be implemented via software, hardware, or a combination of both, and may be implemented in a distributed manner using multiple different computing devices.

A provider network 100 (or cloud provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service(s) 106), the storage service(s) 102 that can store data objects, etc. The users (or "customers") of provider networks 100 may use one or more user accounts that are associated with a customer account, though these terms may be used somewhat interchangeably depending upon the context of use. Users may interact with a provider network 100 across one or more intermediate networks 107 (e.g., the internet) via one or more interface(s) 109, such as through use of application programming interface (API) calls, via a console 126 implemented as a website, application, etc. on a computing device 128. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 109 may be part of, or serve as a front-end to, a control plane of the provider network 100 that includes backend services supporting and enabling the services that may be more directly offered to customers.

For example, a cloud provider network (or just cloud) typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or use compute instances (e.g., a VM using a guest operating system (O/S) that operates using a hypervisor that may or may not further operate on top of an underlying host O/S, a container that may or may not operate in a VM, an instance that can execute on bare metal hardware without an underlying hypervisor), where one or multiple compute instances can be implemented using a single electronic device. Thus, a user may directly use a compute instance (e.g., provided by a hardware virtualization service) hosted by the provider network to perform a variety of computing tasks. Additionally, or alternatively, a user may indirectly use a compute instance by submitting code to be executed by the provider network (e.g., via an on-demand code execution service), which in turn uses a compute instance to execute the code—typically without the user having any control of or knowledge of the underlying compute instance(s) involved.

For example, in various embodiments, a serverless function may include code provided by a user or other entity—such as the provider network itself—that can be executed on demand. Serverless functions may be maintained within provider network 100 by an on-demand code execution service (which may be one of compute service(s) 106) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 140B) that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, the machine learning service(s) 104—via use of a custom model system 108—allows users to build (e.g., train) and use machine learning model(s) 110. The custom model system 108 may obtain, e.g., from a user 112 or otherwise, training data 114 (e.g., labeled image(s)), and then invoke a model training system 116 to train a machine learning model 110 (e.g., a deep neural network (DNN)), without requiring the user 112 to manage servers, implement particular algorithms, etc. The custom model system 108 may further include a model hosting system 118 that hosts one or more hosted model(s) 120. Users may access the hosted model(s) 120 via an endpoint 122 (e.g., an API), as further described below.

At a high level, machine learning may include two major components that facilitate the exposure of advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

In some embodiments, a customer of the provider network 100 (e.g., the user 112) may access the hosted model(s) 120 to perform inference, such as object recognition. For example, the user 112, via a client application 124 (e.g., a web-application implementing a console 126 for the provider network 100, a standalone application, another web-application of another entity that uses the machine learning service(s) 104 as a part of its backend, a database or mixed-SQL environment, etc.) may cause a computing device 128 to send a request to the machine learning service(s) 104 to use a model to label images of dogs and cats, as shown at circle (1). One of the hosted model(s) 120 (e.g., a first model 130) may be configured to recognize dogs and cats, and so the user may provide as input a set of unlabeled images 132A depicting dogs and cats to be labeled using the first model 130. In some embodiments, the user may upload the unlabeled images 132A to be stored at the storage service(s) 102 (e.g., an object storage service), as shown at circle (2), and also provide an indicator to the machine learning service(s) 104 of a storage location of the unlabeled images 132A. In other embodiments, the user may upload the unlabeled images 132A directly to the machine learning service(s) 104 (e.g., in the request to the machine learning service(s) 104 to use a model to label images of dogs and cats). The machine learning service(s) 104 may subsequently perform inference (e.g., object recognition and/or labeling) on the unlabeled images 132A and return as output a set of labeled images 134A. For example, as shown at circle (3), the set of labeled images 134A may be provided to the storage service(s) 102 where they may be stored as labeled images 134A. Alternatively, or in addition, the set of labeled images 134A may be provided to the requesting computing device 128, as shown at dashed circle (3).

In some embodiments, none of the hosted model(s) 120 may be configured to recognize an object class that the customer desires to label. For example, the customer may have images that depict dogs, cats, and elephants. While the first model 130 is configured to recognize dogs and cats, the first model 130 is not configured to recognize elephants, nor is any other model from among the hosted model(s) 120 configured to recognize elephants (in this hypothetical example). In this scenario, according to some embodiments, the user 112, via the client application 124 may cause the computing device 128 to send a request to the machine learning service(s) 104 to train a model to label images of dogs, cats, and elephants, as shown at circle (4). The user may provide as input the training data 114 comprising a set of labeled images depicting elephants. In some embodiments, the user may upload the training data 114 to be stored at the storage service(s) 102, as shown at circle (5), and also provide an indicator to the machine learning service(s) 104 of a storage location of the training data 114. In other embodiments, the user may upload the training data 114 directly to the machine learning service(s) 104 (e.g., in the request to the machine learning service(s) 104 to train a model to label images of dogs, cats, and elephants). For example, in some embodiments the request to train the model to label images of elephants may be of a type that identifies which type of model is to be created, (e.g., CreateDNNModel for creating a trained DNN model). The request may also include one or more of an identifier of a storage location (or locations) storing the training data 114, which may identify a storage location (e.g., via a Uniform Resource Locator (URL), a bucket/folder identifier, etc.) within the provider network 100 (e.g., as offered by the storage service(s) 102), a format identifier of the training data 114 (e.g., image format), etc. In some embodiments, the request includes the training data 114 within the request.

Responsive to receipt of the training request, the model training system 116 of the custom model system 108 is invoked and begins operations for training the requested type of model, as shown at circle (6). For example, the custom model system 108 may identify the storage location(s) of the training data 114. The custom model system 108 may then retrieve any stored training data 114, which may be from a storage location within the provider network 100 (e.g., the storage service(s) 102, as shown at circle (7)) or external to the provider network 100.

The custom model system 108 may also identify what type of model is to be trained (e.g., via analyzing the method call associated with the request). In this example, the request is to train a model to label images of dogs, cats, and elephants. Since the first model 130 is configured to label images of dogs and cats, the custom model system 108 may invoke the model training system 116 to train a copy of a proper subset of the first model 136. For example, the first model 130 may be retrieved from the model hosting system 118, and the copy of the proper subset of the first model 136 may be loaded into or stored at the model training system 116, as shown at circle (8). The process for generating the copy of the proper subset of the first model 136 is described below. Subsequently, the model training system 116 may train the copy of the proper subset of the first model 136 using the training data 114 to generate a second model 138, as shown at circle (9). The trained second model 138, which is configured to label images of dogs, cats, and elephants, may be hosted at the model hosting system 118, as shown at circle (10), and subsequently used to perform inference. For example, the user 112, via the client application 124, may cause the computing device 128 to send a request to the machine learning service(s) 104 to use a model to label images of dogs, cats, and elephants, as shown at circle (11). In some embodiments, the user may upload the unlabeled images 132B to be stored at the storage service(s) 102, as shown at circle (12), and also provide an indicator to the machine learning service(s) 104 of a storage location of the unlabeled images 132B. In other embodiments, the user may upload the unlabeled images 132B directly to the machine learning service(s) 104 (e.g., in the request to the machine learning service(s) 104 to use a model to label images of dogs, cats, and elephants). The machine learning service(s) 104 may subsequently perform inference (e.g., object recognition and/or labeling) on the unlabeled images 132B and return as output a set of labeled images 134B. For example, as shown at circle (13), the set of labeled images 134B may be provided to the storage service(s) 102 where they may be stored as labeled images 134B. Alternatively, or in addition, the set of labeled images 134B may be provided to the requesting computing device 128, as shown at dashed circle (13).

In some embodiments, the model hosting system 118 of the custom model system 108 may expose the hosted model(s) 120 (e.g., the first and second models 130, 138 and/or other models) via the endpoint 122, such that the hosted model(s) 120 may receive inference requests 140A from one or more client applications 142A executed by one or more computing devices 144 outside of the provider network 100, as shown at dashed circle (14), and/or from one or more client applications 142B executed by one or more computing devices of the compute service(s) 106 (e.g., hardware virtualization service, serverless code execution service, etc.) within the provider network 100, as shown at dashed circle (15). After the hosted model(s) 120 perform inference, inference results 140B may be provided back to the applications 142A and/or 142B, as shown at dashed circles (16), (17), respectively. Advantageously, the inference requests 140A may be sent to the model hosting system 118 via the endpoint 122, which may comprise a single API in some embodiments. In such embodiments, the customer enjoys the convenience of using a single API to send inference requests. For example, when the customer desires to label a set of images, and the images depict several different object classes, the customer may send an inference request 140A via the single API and/or provide the unlabeled images via the single API.

Figure 2:
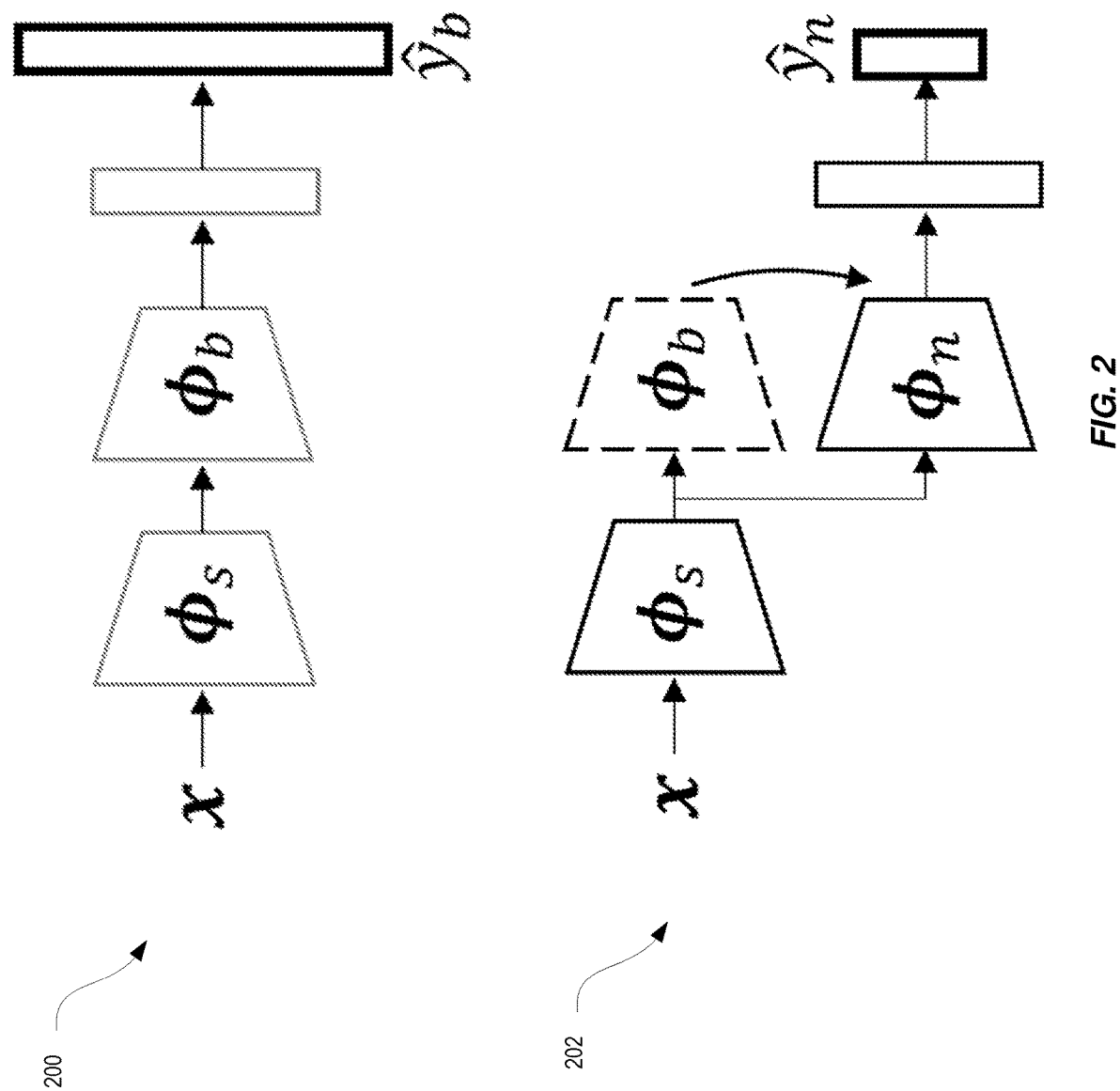
FIG. 2 is a block diagram illustrating a first machine learning model and a portion of a second machine learning model according to some examples.
Figure 3:
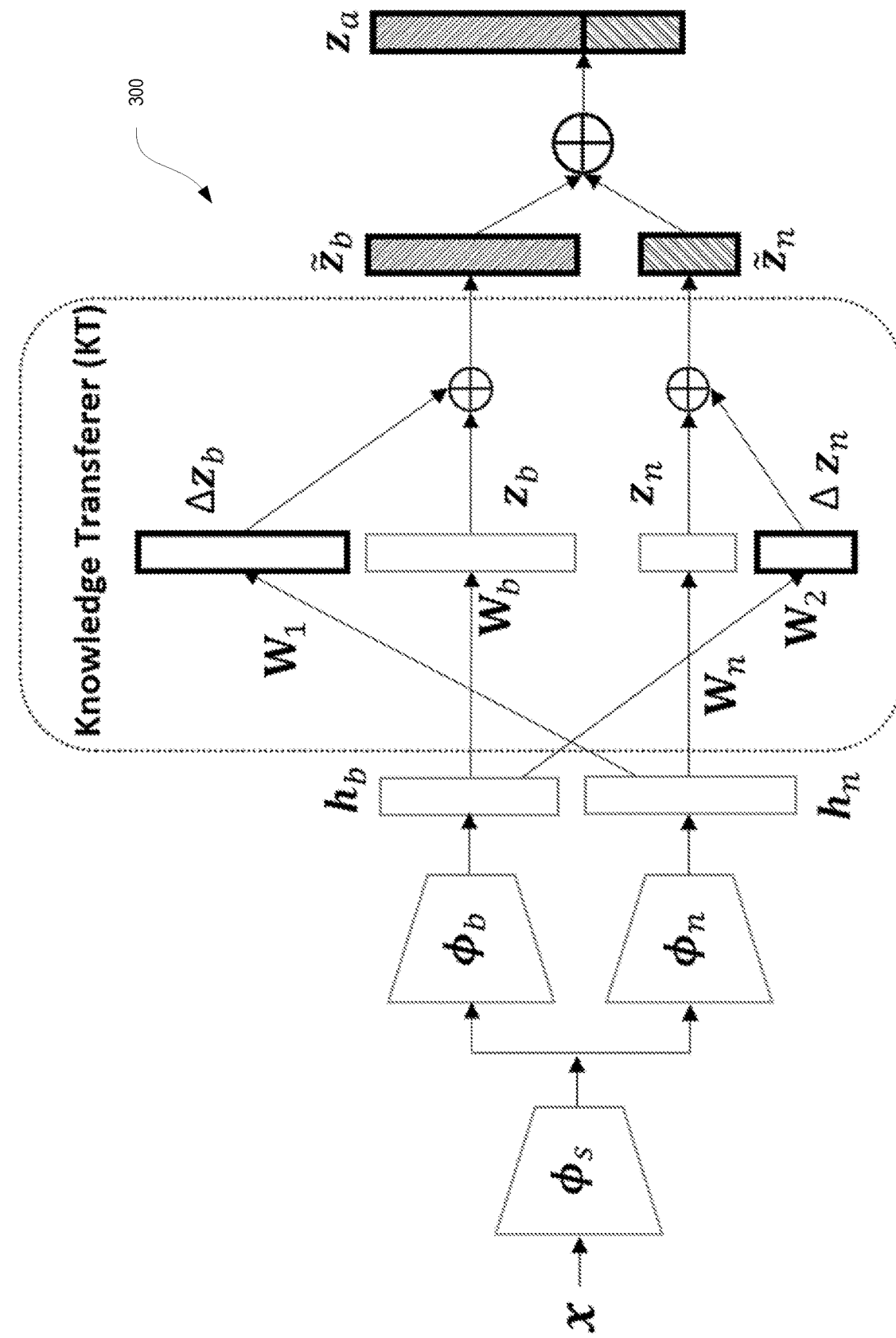
FIG. 3 is a block diagram illustrating a second machine learning model according to some examples.
Figure 4:
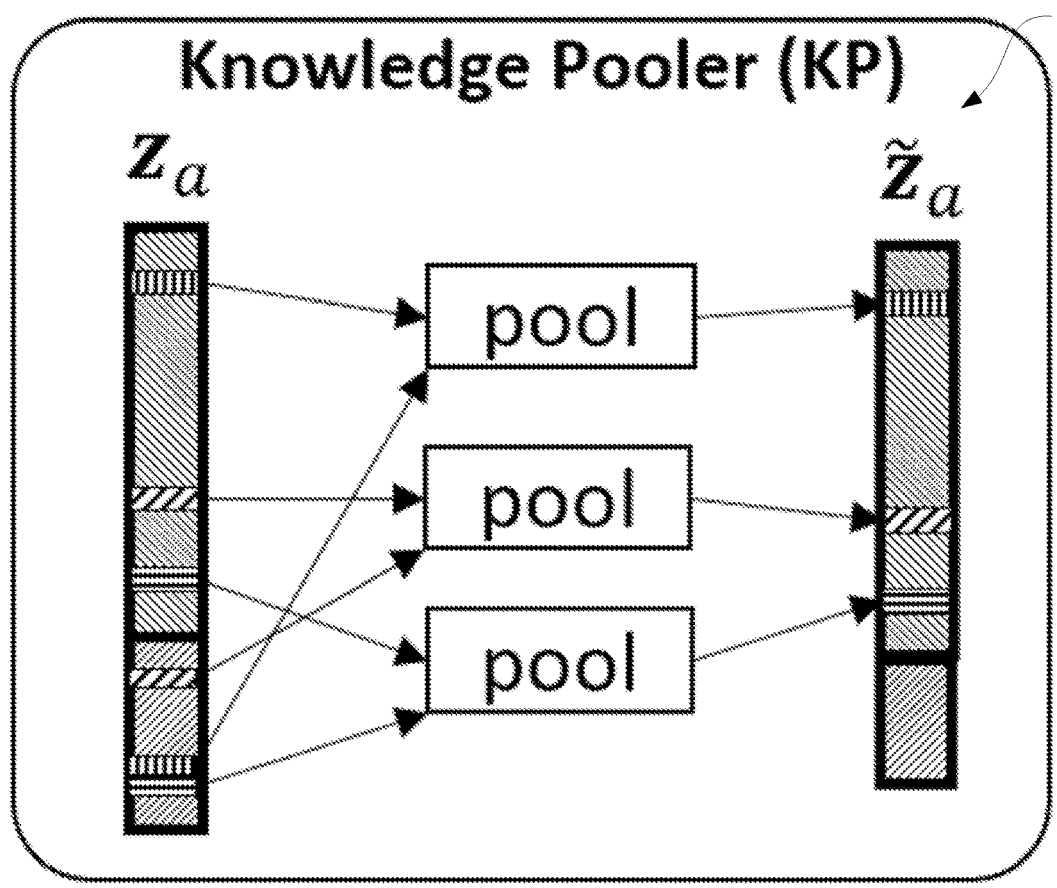
FIG. 4 is a block diagram illustrating a knowledge pooler and a symbol key used in connection with the second machine learning model of FIG. 3 according to some examples.
Figure 4:
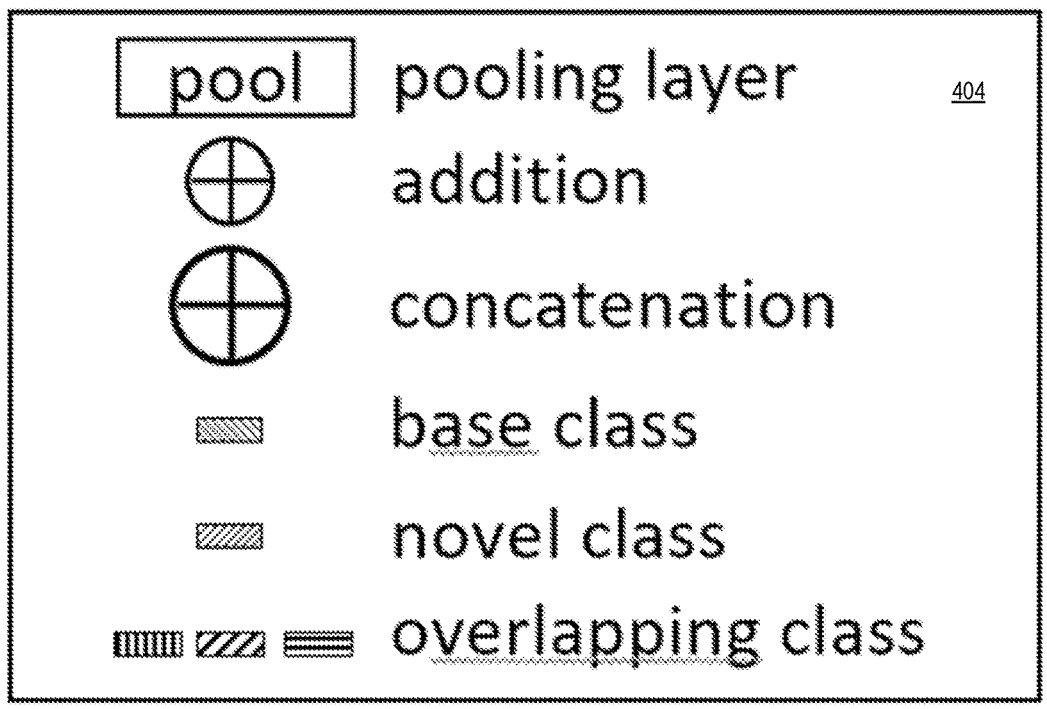

FIGS. 2 and 3 are block diagrams illustrating a first machine learning model 200 and a second machine learning model 300, respectively, of a two-stage incremental training pipeline according to some examples. FIG. 4 is a block diagram illustrating a knowledge pooler 402 and a symbol key 404 used in connection with the second machine learning model 300 of FIG. 3 according to some examples. In some embodiments, the machine learning models 200, 300, as well as the knowledge pooler, may be implemented in the model training system 116 described above and shown in FIG. 1. Before describing the machine learning models 200, 300, however, a discussion of the problem formulation and details of the solution according to some of the present embodiments are presented below.

Given a dataset $D=\{(x_i, y_i)\}_{i=1}^N$, where $x_i$ and $y_i$ are data and label, respectively, the goal of a traditional classification network is to learn a feature extractor $h(\cap; \Phi) \in \mathbb{R}^k$ and a linear classifier $W \in \mathbb{R}^{k \times |Y|}$, where Y is the label set of D. This is usually obtained by minimizing the cross-entropy loss, $$L_{ce} = -\frac{1}{N}\sum_{i=1}^N \log \hat{p}^{(y_i)}(x_i) \quad (1)$$

where $$\hat{p}(x) = \sigma(W^T h(x;\Phi)), \quad (2)$$

$\sigma(\bullet)$ is the softmax function, and $v^{(l)}$ is the $l^{th}$ element of v.

Some of the present embodiments provide a two-stage incremental training pipeline, which is illustrated in FIGS. 2-4. FIG. 2 illustrates a first machine learning model 200 and a portion 202 of a second machine learning model 300 (FIG. 3) according to some examples. As described below, the first machine learning model 200, which may also be referred to as a pre-trained model, is configured (e.g., trained) to recognize one or more object classes (e.g., dogs and cats). According to some examples, a proper subset (e.g., the encoder with parameter $\Phi_b$) of the first machine learning model 200 is copied to generate a new branch $\Phi_n$, as shown in the portion 202 of the second machine learning model 300 in FIG. 2. The new branch is then trained to recognize one or more new (novel) object classes (e.g., elephants), and the resulting second model 300 is shown in FIG. 3.

The following process first formulates using one incremental step (base+novel). With reference to FIG. 2, in Stage I (feature augmentation) the pretrained feature extractor $h(\bullet; \Phi)$ is split into two sub-networks, where the encoder with parameter $\Phi_s$ is followed by the encoder with parameter $\Phi_b$, $\Phi=\{\Phi_s, \Phi_b\}$. To optimize the features for $D_n$ without forgetting the ones for $D_b$, some of the present embodiments expand the features by copying (e.g., cloning) the sub-network of $\Phi_b$ to the branch $\Phi_n$ as the adaptation module, and fine-tuning $\Phi_n$ and the weights of the novel class classifier $W_n \in \mathbb{R}^{k \times |Y_n|}$ on $D_n$ with the loss of Equation (1) above. The shared $\Phi_s$ is frozen. This setup ensures no forgetting in the old representation, while enabling feature learning to accommodate new knowledge. While the optimal size of the frozen $\Phi_s$ depends on the data discrepancy between base and novel splits, some of the present embodiments adopt the last convolutional block (e.g., layer4) as $\Phi_b$, as it suffices for most cases, and $\Phi_s$ is the layer1-3 blocks.

With reference to FIG. 3, in Stage II (fusion), the first-stage training generates the base and novel classifiers $M_b(\bullet; \Phi_s, \Phi_s, \Phi_b, W_b)$ and $M_n(\bullet; \Phi_s, \Phi_n, W_n)$, optimized for $Y_b$ and $Y_n$, respectively. Below is introduced a score fusion scheme to combine the knowledge of the two networks and get a unified classifier of the label set $Y_a$, where $Y_a = Y_b \cup Y_n$.

Some of the present embodiments maintain one extra branch per new step (multiple incremental steps): $\{\Phi_b, W_b, \Phi_{n1}, W_{n1}, \ldots, \Phi_{nT}, W_{nT}\}$. In each novel step $t \in \{1 \ldots T\}$, the new branch $\Phi_{nt}$ is initialized with $\Phi_b$, fine-tune it, and re-fuse all t+1 branches.

Some embodiments of the present score fusion network (FIGS. 2-4) integrate the knowledge and output of all branches and generate a unified probability distribution. Modifying the existing well-trained classifiers with few samples leads to overfitting while being susceptible to class imbalance in the limited data, but freezing everything rules out knowledge transfer opportunities between branches. In addition, predictions regarding overlapping classes need unified scores from base and novel classifiers. To address these technical problems, some of the present embodiments introduce knowledge-preserving transfer, overlap knowledge integration schemes, and balanced optimization.

Knowledge-preserving transfer: After the Stage I training, some of the present embodiments obtain expert models for each step $\{\Phi_d, W_d\}$ (for $d \in \{b, n1, \ldots, nt\}$), where the probability of the individual classifier is computed by applying the softmax function on the logit score $z_d = W_d^T h_d$, $W_d \in \mathbb{R}^{k \times |Y_d|}$. To prevent overfitting to the small dataset of $\varepsilon \cup D_{nt}$, some of the present embodiments also freeze all classifier weights (e.g., $W_b$, $W_{nT}$, in addition to $\Phi_s$, $\Phi_b$, $\Phi_{n\tau}$, $\tau \in [1, t]$) to preserve their capability of distinguishing classes within the same split. To additionally enable the knowledge transfer between the two splits, some of the present embodiments use $\varepsilon \cup D_{nt}$ to learn $W_{dd'} \in \mathbb{R}^{k \times |Y_d|}$, $d, d' \in \{b, n1, \ldots, nt\}$, $d \neq d'$ (randomly initialized), connecting d' branch's features to d branch's logits, which are used to learn the delta logits for knowledge transfer, to be added to the final logits for the d branch:

$$\Delta z_d = \sum_{\substack{d'=b,n1,\ldots,nt \\ d' \neq d}} W_{dd'}^T h_{d'}, \quad (6)$$

$$\tilde{z}_d = z_d + \Delta z_d. \quad (7)$$

Overlap knowledge integration: To get a unified classifier with probability distribution for all the classes, some of the present embodiments combine the logit scores of the base and novel branches by concatenation, (e.g., $z_a = \tilde{z}_b \oplus \tilde{z}_{n1} \oplus \ldots \oplus \tilde{z}_{nt}$ where $\tilde{z}_d \in \mathbb{R}^{|Y_d|}$, $d \in \{b, n1, \ldots, nt\}$, and obtain the posterior probability with $\sigma(z_a)$. However, when overlapping classes exist ($Y_d \cap Y_{d'} \neq \emptyset$, $\exists d, d'$), they appear in $\tilde{z}_a$ multiple times. Some of the present embodiments apply a knowledge pooler to $z_a \in \mathbb{R}^{\Sigma_d |Y_d|}$ to get the final logit $\tilde{z}_a \in \mathbb{R}^{|Y_a|}$, as illustrated in FIG. 4, that either max-pools or average-pools the multiple logit scores for each overlapping class. Note that $\tilde{z}_a = z_a$ when $Y_d \cap Y_{d'} \neq \emptyset$, $\forall d, d'$. Experimental results have shown that max-pooling performs better than average-pooling, since the branches do not always simultaneously output high responses to a sample on its class, especially when the data of the same class are very different in base and novel splits.

Balanced optimization: With the final logit score $\tilde{z}_{a,i}$ for each sample $x_i \in \varepsilon \cup D_{nt}$, the parameters $W_{dd'}$ can be optimized with the loss of Equation (1) above. However, since $|D_{nt}| >> |\varepsilon|$, the training will be dominated by the novel classes. To balance the probability estimation, some of the present embodiments sample a subset $B \subset \varepsilon \cup D_{nt}$ uniformly over all the classes, where each class in B has an equal number of samples. With this class-balanced sampling, the classification loss becomes:

$$L_{cls} = \frac{1}{|\mathcal{B}|} \sum_{i=1}^{|\mathcal{B}|} -\log \hat{p}^{(y_i)}(x_i) \quad \hat{p}(x) = \sigma(\tilde{z}_a). \quad (8)$$

However, in addition to the sample imbalance, the number of classes is also highly imbalanced. Since $|Y_b| >> |Y_{nt}|$, base logits have more chances of being the largest than novel logits, so Equation (8) will favor one of the base classes, which may or may not be desired depending on the application. To control base and novel logit balance, some of the present embodiments explore two regularization mechanisms.

First, some of the present embodiments explicitly train to balance the largest base logit and the largest novel logit scores, by adding a routing auxiliary loss over the maximum score from each split. The routing classifier can be defined as:

$$r(x) = \sigma\left(W_{r,aux}^T\left(\max_l \tilde{z}_b^{(l)} \oplus \max_l \tilde{z}_{n1}^{(l)} \oplus \ldots \oplus \max_l \tilde{z}_{nt}^{(l)}\right)\right), \quad (9)$$

Where $W_{r,aux} \in \mathbb{R}^{(t+1) \times (t+1)}$ is the linear routing classifier's weights. The full loss then becomes:

$$L_{total} = (1-\alpha) \cdot L_{cls} + \alpha \cdot L_{rt-bal}, \quad (10)$$

with $L_{cls}$ from Equation (8), $L_{rt-bal}$ from:

$$L_{rt-bal} = \frac{1}{2|\varepsilon|} \sum_{x_i \in \varepsilon} l_{rt}(x_i, r_i) + \frac{1}{2|\mathcal{D}_n|} \sum_{x_i \in \mathcal{D}_n} l_{rt}(x_i, r_i). \quad (5)$$

using $\hat{r}$ from Equation (9), and $\alpha$ is a loss weight hyperparameter.

Second, during training some of the present embodiments normalize and scale $h_{d'}$ for base samples by a factor of $\beta \in [0,1]$ before feeding it into $W_{bd'}$, $d' \neq b$. This prevents the training from drastically influencing base classes, but limits the knowledge transfer from novel branch features to base classes.

Like all imbalanced learning problems, there is a tradeoff between the performance of base and novel classes. Using the two regularization mechanisms described above provides the flexibility to optimize for the metric that matters more for each customized application.

Experimental results for the above-described two-stage incremental training pipeline have shown that accurate classification of the novel class(es) can be achieved without significantly reducing the accuracy of the classification of the base class(es). For example, Table 1 below shows experimental results compared to other class-incremental learning (CIL) methods (fine-tuning, LwF, iCaRL, BiC, WA, DER w/o P) and the joint training oracle that uses all base data. For some of the present embodiments (indicated as score fusion in Table 1), the experimental results include three operating points: the one with the best $Acc_{all}$ (accuracy over all classes), the one with the best $Acc_{avg}$ (accuracy when there is class overlap), and a balanced performance of these two metrics. Compared with existing CIL methods with the same backbone, some of the present embodiments achieve significantly better performance in both $Acc_a ii$ and $Acc_{avg}$. For fair comparison, the experimental results also include branching at the classifier layer ("fc-only") to make the number of network parameters on par with most compared methods, e.g. $\Phi_s = \Phi$, $\Phi_b = \Phi_n = \emptyset$, and $h_b = h_n$. Some of the present embodiments still outperform all compared methods, and interestingly, the ResNet10 results for the present embodiments outperform ResNet18 results of others, despite using fewer parameters. These results make intuitive sense, given that the base model (the encoder with parameter $\Phi_s$ and the sub-network of $\Phi_b$) is frozen in some of the present embodiments. When a set of unlabeled images is fed to the encoder with parameter $\Phi_s$, the sub-network of $\Phi_b$ performs inference on the object class(es) for which it has been pretrained. Since this portion of the model is unchanged, accuracy for detecting the pretrained classes is similarly unchanged.

TABLE 1

| Method | # of params | ResNet10 | | | | # of params | ResNet18 | | | |
| --- | --- | --- | --- | --- | --- | --- | --- | --- | --- | --- |
| | | $Acc_{all}$ | $Acc_{base}$ | $Acc_{novel}$ | $Acc_{avg}$ | | $Acc_{all}$ | $Acc_{base}$ | $Acc_{novel}$ | $Acc_{avg}$ |
| fine-tuning | 4.9M | 4.18 | 0.01 | 87.63 | 43.82 | 11.2M | 4.25 | 0.00 | 89.37 | 44.68 |
| LwF | | 9.50 | 5.54 | 88.53 | 47.04 | | 9.50 | 5.46 | 90.30 | 47.88 |
| iCaRL | | 16.26 | 13.91 | 63.40 | 38.66 | | 10.65 | 8.15 | 60.80 | 34.78 |
| BiC | | 3.30 | 27.55 | 85.20 | 56.38 | | 31.50 | 28.75 | 86.68 | 57.68 |
| WA | | 31.33 | 32.33 | 31.40 | 41.87 | | 54.79 | 55.17 | 47.20 | 51.19 |
| DER w/o P | | 51.33 | 52.43 | 50.10 | 51.27 | — | — | — | — | — |
| score fusion (ours) best-$Acc_{all}$ | 8.6M | 63.24 | 63.77 | 52.67 | 58.22 | 19.6M | 69.45 | 70.01 | 58.13 | 64.07 |
| score fusion (ours) best-balanced | | 62.15 | 61.49 | 75.37 | 68.43 | | 67.36 | 66.61 | 82.37 | 74.49 |
| score fusion (ours) best-$Acc_{avg}$ | | 58.90 | 57.73 | 82.40 | 70.06 | | 65.83 | 64.85 | 82.50 | 75.17 |
| score fusion (ours, fc-only) best-$Acc_{all}$ | 4.9M | 62.63 | 63.36 | 44.53 | 54.05 | 11.2M | 68.79 | 69.58 | 53.07 | 61.32 |
| score fusion (ours, fc-only) best-balanced | | 61.01 | 60.81 | 65.07 | 62.94 | | 66.76 | 66.50 | 71.83 | 69.17 |
| score fusion (ours, fc-only) best-$Acc_{avg}$ | | 57.91 | 57.24 | 71.57 | 64.40 | | 65.89 | 65.49 | 73.77 | 69.63 |
| joint learning (oracle) | 4.9M | 63.80 | 63.94 | 61.00 | 62.47 | 11.2M | 70.32 | 70.43 | 68.20 | 69.32 |

Metrics: In prior work, the number of base and novel classes are usually balanced (e.g., $|Y_b|=|Y_n|=50$), so it is natural to simply evaluate using the accuracy over all the classes, i.e. $Acc_{all}=A(D_{test})$, where $D_{test}$ is the testing set and $$A(S) = \frac{1}{|S|}\sum_{(x,y)\in S} \mathbb{1}_{[y=argmax_k \hat{p}^{(k)}(x)]}$$

either at t=T or averaged over all incremental steps (identical to incremental accuracy). The experimental results in Table 1 follow the version that includes the base step t=0 to facilitate comparison. However, in the setting of strong pretrained models, $|Y_b|>>|Y_n|$ e.g., 800 and 40. In this case, the overall accuracy will be dominated by the base class performance. A model with high overall accuracy is not guaranteed to perform well for the novel classes. Hence, in addition to the overall accuracy, the experimental results in Table 1 also present the accuracy in each split. When there is overlap, $Acc_{base}=A(\{(x,y):(x,y)\in D_{test}, y\in y_b\backslash(y_b\cap y_n)\})$, $Acc_{novel}=A(\{(x,y):(x,y)\in D_{test}, y\in y_n\backslash(y_b\cap y_n)\})$, and $Acc_{ovlp}=A(\{(x,y):(x,y)\in D_{test}, y\in (y_b\cap y_n)\})$. Note that the classification is still predicted among all classes. An aggregate metric to balance among the per-split accuracy is the average of them:

$$Acc_{base} = \frac{\sum_{d\in\{b,n1,\ldots,nt\}} Acc_d}{t+1}$$

either at the final t=T step or follow the 500+50×10 split implementation by averaging over all steps ($Acc_{avg}^{t=0\ldots 10}$). When there is class overlap, $Acc_{avg}=(Acc_{base}+Acc_{novel}+Acc_{ovlp})/3$ for partial overlap, and $Acc_{avg}=(Acc_{base}+Acc_{ovlp})/2$ for full overlap ($Y_n\subseteq Y_b$).

Figure 5:
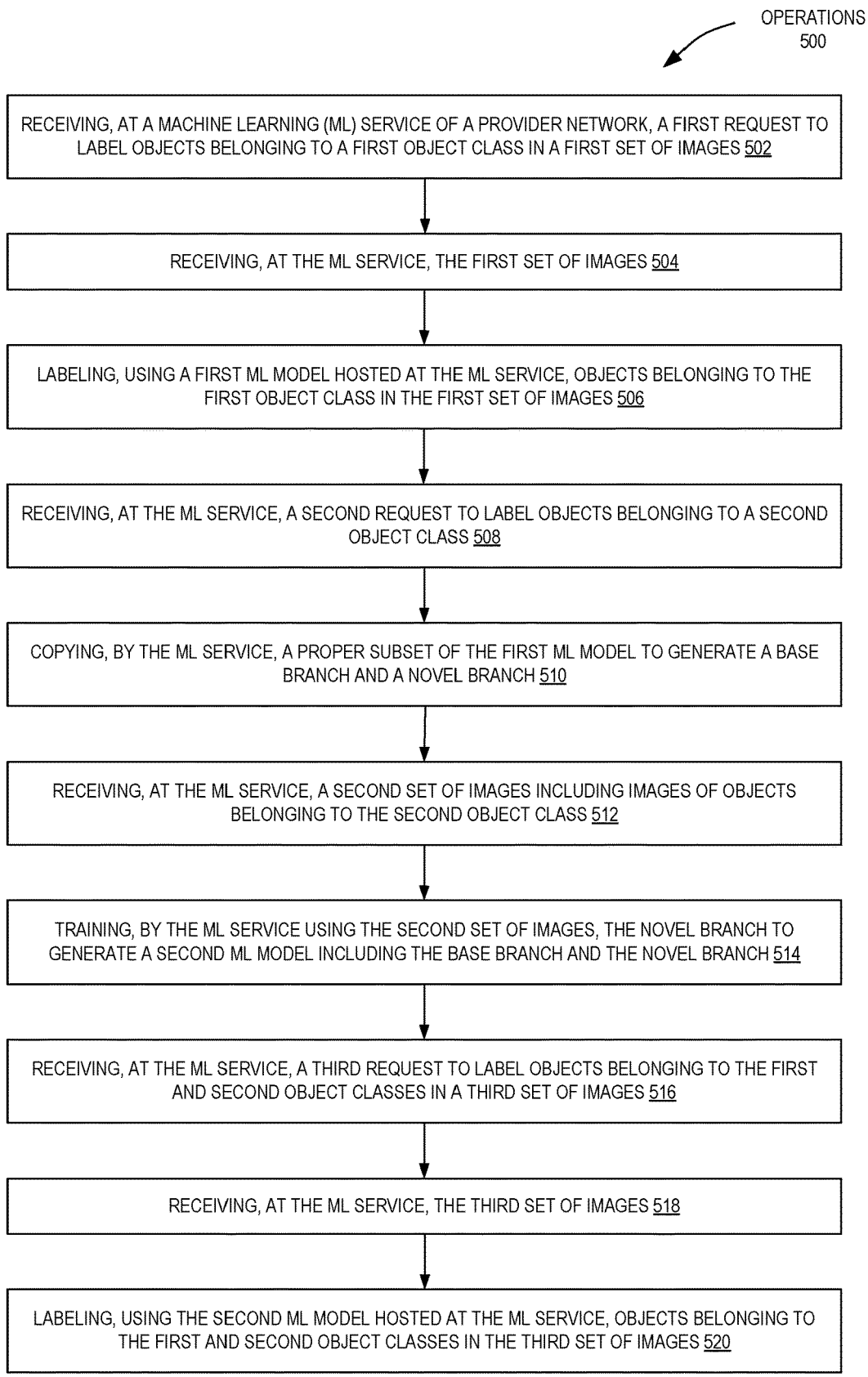
FIG. 5 is a flow diagram illustrating operations of a method for labeling using at least one machine learning model according to some examples.

FIG. 5 is a flow diagram illustrating operations 500 of a method for labeling using at least one machine learning model according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the storage service(s) 102 and/or the machine learning service(s) 104 of the other figures.

The operations 500 include, at block 502, receiving, at a machine learning (ML) service (e.g., the machine learning service(s) 104) of a provider network, a first request to label objects belonging to a first object class in a first set of images.

The operations 500 further include, at block 504, receiving, at the ML service, the first set of images.

The operations 500 further include, at block 506, labeling, using a first ML model hosted at the ML service, objects belonging to the first object class in the first set of images.

The operations 500 further include, at block 508, receiving, at the ML service, a second request to label objects belonging to a second object class.

The operations 500 further include, at block 510, copying, by the ML service, a proper subset of the first ML model to generate a base branch and a novel branch.

The operations 500 further include, at block 512, receiving, at the ML service, a second set of images including images of objects belonging to the second object class.

The operations 500 further include, at block 514, training, by the ML service using the second set of images, the novel branch to generate a second ML model including the base branch and the novel branch.

The operations 500 further include, at block 516, receiving, at the ML service, a third request to label objects belonging to the first and second object classes in a third set of images.

The operations 500 further include, at block 518, receiving, at the ML service, the third set of images.

The operations 500 further include, at block 520, labeling, using the second ML model hosted at the ML service, objects belonging to the first and second object classes in the third set of images.

Figure 6:
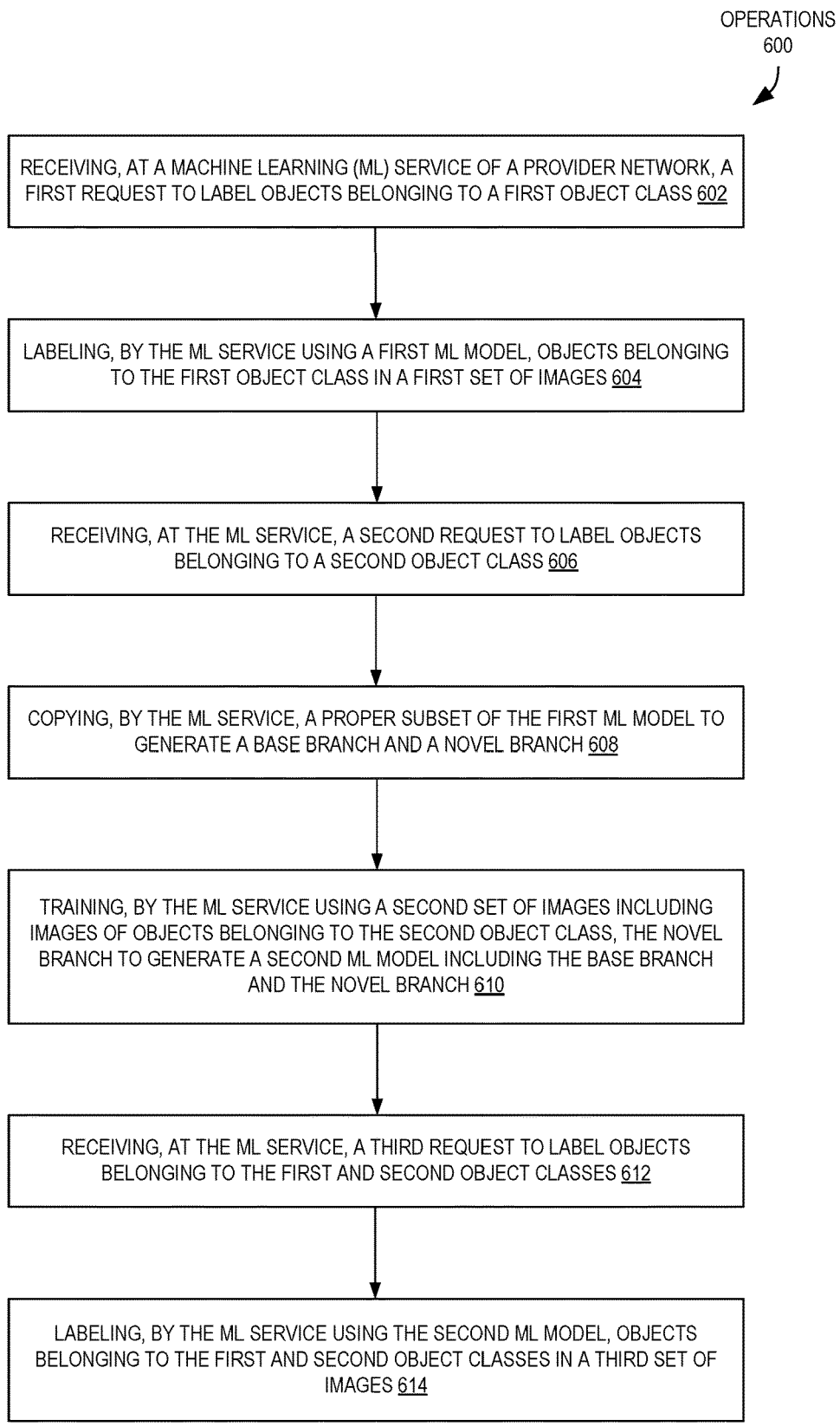
FIG. 6 is a flow diagram illustrating operations of another method for labeling using at least one machine learning model according to some examples.

FIG. 6 is a flow diagram illustrating operations 600 of another method for labeling using at least one machine learning model according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the storage service(s) 102 and/or the machine learning service(s) 104 of the other figures.

The operations 600 include, at block 602, receiving, at a machine learning (ML) service (e.g., the machine learning service(s) 104) of a provider network, a first request to label objects belonging to a first object class.

The operations 600 further include, at block 604, labeling, by the ML service using a first ML model, objects belonging to the first object class in a first set of images.

The operations 600 further include, at block 606, receiving, at the ML service, a second request to label objects belonging to a second object class.

The operations 600 further include, at block 608, copying, by the ML service, a proper subset of the first ML model to generate a base branch and a novel branch.

The operations 600 further include, at block 610, training, by the ML service using a second set of images including images of objects belonging to the second object class, the novel branch to generate a second ML model including the base branch and the novel branch.

The operations 600 further include, at block 612, receiving, at the ML service, a third request to label objects belonging to the first and second object classes.

The operations 600 further include, at block 614, labeling, by the ML service using the second ML model, objects belonging to the first and second object classes in a third set of images.

Figure 7:
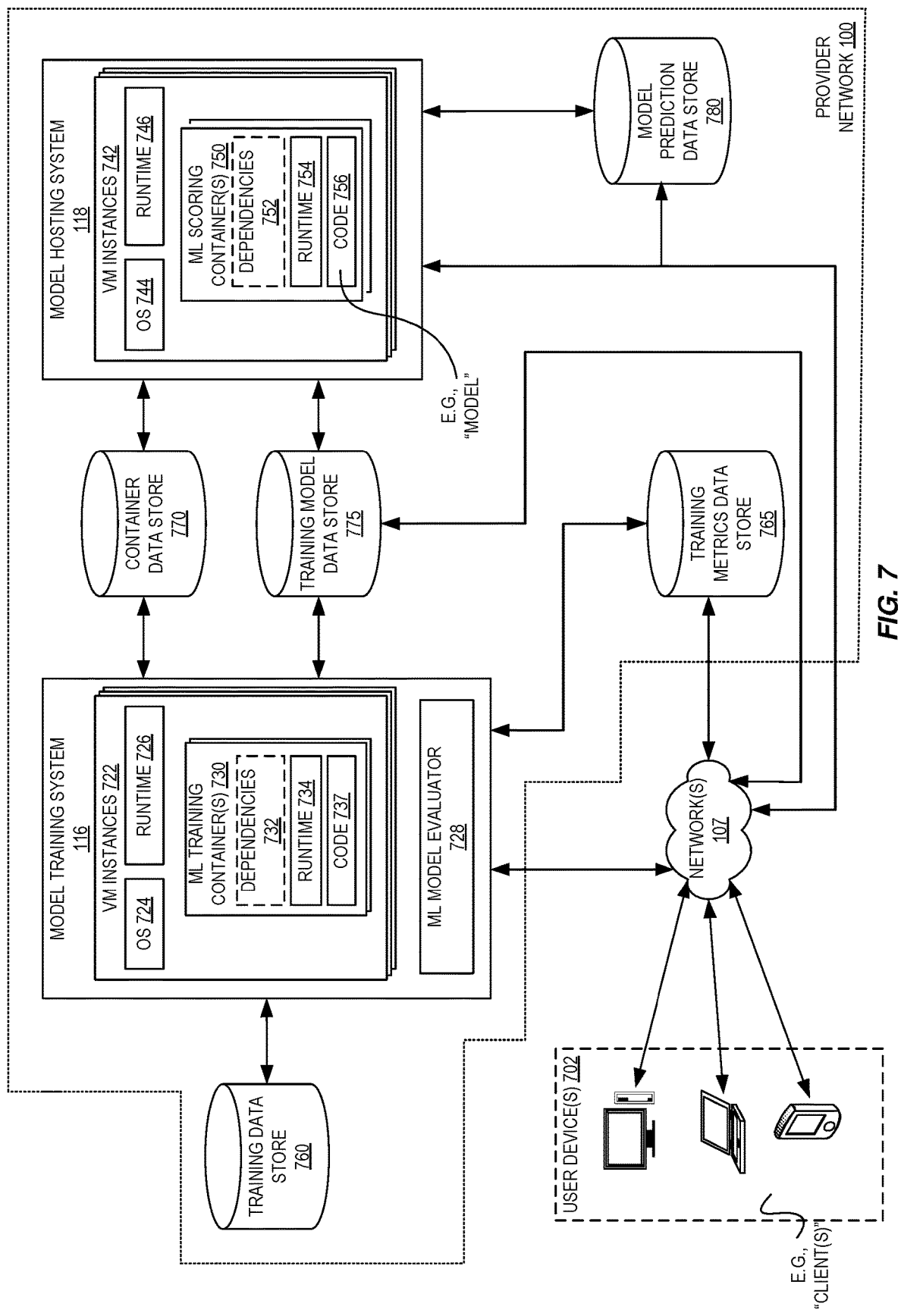
FIG. 7 is a block diagram of an illustrative operating environment in which machine learning models are trained and hosted according to some examples.

FIG. 7 is a block diagram of an illustrative operating environment in which machine learning models are trained and hosted according to some embodiments. The operating environment includes end user devices 702 (for example, computing devices(s), edge device(s)), a model training system, a model hosting system, a training data store 760, a training metrics data store 765, a container data store 770, a training model data store 775, and a model prediction data store 780. A machine learning service described herein may include one or more of these entities, such as the model training system 116, the model hosting system 118, etc.

In some embodiments, users, by way of user devices 702, interact with the model training system 116 to provide data that causes the model training system 116 to train one or more machine learning models, for example, as described elsewhere herein. A machine learning model, generally, may be thought of as one or more equations that are "trained" using a set of data. In some embodiments, the model training system 116 provides ML functionalities as a web service, and thus messaging between user devices 702 and the model training system 116 (or provider network 100), and/or between components of the model training system 116 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 116 via frontend 729 of the model training system 116. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 116 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 116, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 116 can retrieve the container image from the indicated location and create a container using the retrieved container image. The container is then loaded into a virtual machine instance 722 for training a machine learning model, as described in greater detail below.

The model training system 116 can use the information provided by the user device 702 to train a machine learning model in one or more pre-established virtual machine instances 722 in some embodiments. In particular, the model training system 116 includes a single physical computing device or multiple physical computing devices that are interconnected using one or more computing networks (not shown), where the physical computing device(s) host one or more virtual machine instances 722. The model training system 116 can handle the acquisition and configuration of compute capacity (for example, containers, instances, etc., which are described in greater detail below) based on the information describing the computing machine on which to train a machine learning model provided by the user device 702. The model training system 116 can then train machine learning models using the compute capacity, as is described in greater detail below. The model training system 116 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are used to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be used to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or use) code or libraries from dependencies 732. The runtime 734 is configured to execute the code 737 in response to an instruction to begin machine learning model training. Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 used by the virtual machine instance 722. In some embodiments, the runtime 734 is different than the runtime 726 used by the virtual machine instance 722.

In some embodiments, the model training system 116 uses one or more container images included in a training request (or a container image retrieved from the container data store 770 in response to a received training request) to create and initialize a ML training container 730 in a virtual machine instance 722. For example, the model training system 116 creates a ML training container 730 that includes the container image(s) and/or a top container layer.

Prior to beginning the training process, in some embodiments, the model training system 116 retrieves training data from the location indicated in the training request. For example, the location indicated in the training request can be a location in the training data store 760. Thus, the model training system 116 retrieves the training data from the indicated location in the training data store 760. In some embodiments, the model training system 116 does not retrieve the training data prior to beginning the training process. Rather, the model training system 116 streams the training data from the indicated location during the training process. For example, the model training system 116 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 116 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 116 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 116 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 116 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 116 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 116 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 116 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 116 can significantly reduce the training time in some embodiments.

In some embodiments, the model training system 116 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 116 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 760. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 116 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 116 can modify the machine learning model accordingly. For example, the model training system 116 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 116 can cause the virtual machine instance 722 to modify the execution of code stored in an existing ML training container 730 according to the data provided in the modification request. In some embodiments, the user, via the user device 702, can transmit a request to the model training system 116 to stop the machine learning model training process. The model training system 116 can then instruct the virtual machine instance 722 to delete the ML training container 730 and/or to delete any model data stored in the training model data store 775.

As described below, in some embodiments, the model data stored in the training model data store 775 is used by the model hosting system 118 to deploy machine learning models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 116 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 118, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 used by the virtual machine instance 742. In some embodiments, runtime 754 is different than the runtime 746 used by the virtual machine instance 742.

In some embodiments, the model hosting system 118 uses one or more container images included in a deployment request (or a container image retrieved from the container data store 770 in response to a received deployment request) to create and initialize a ML scoring container 750 in a virtual machine instance 742. For example, the model hosting system 118 creates a ML scoring container 750 that includes the container image(s) and/or a top container layer.

As described above, a user device 702 can submit a deployment request and/or an execution request to the model hosting system 118 via the frontend 749 in some embodiments. A deployment request causes the model hosting system 118 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 118 initializes ones or more ML scoring containers 750 in one or more hosted virtual machine instance 742. In embodiments in which the deployment request includes an identification of one or more container images, the model hosting system 118 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 118 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 118 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 118 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 118 unarchives or decompresses the model data file to obtain multiple individual files and inserts the individual files into the ML scoring container 750. In some embodiments, the model hosting system 118 stores the model data file in the same location as the location in which the model data file was stored in the ML training container 730 that generated the model data file. For example, the model data file initially was stored in the top container layer of the ML training container 730 at a certain offset, and the model hosting system 118 then stores the model data file in the top container layer of the ML scoring container 750 at the same offset.

In embodiments in which multiple model data files are identified in the deployment request, the model hosting system 118 retrieves the identified model data files from the training model data store 775. The model hosting system 118 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 118 associates the initialized ML scoring container(s) 750 with the endpoint identified in the deployment request. For example, each of the initialized ML scoring container(s) 750 can be associated with a network address. The model hosting system 118 can map the network address(es) to the identified endpoint, and the model hosting system 118 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 118 via the frontend 749, where the execution request identifies an endpoint and includes an input to a machine learning model (for example, a set of input data). The model hosting system 118 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 118 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend 749 (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 118 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 116, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 116 and the model hosting system 118 depicted in FIG. 7 are not meant to be limiting. For example, the model training system 116 and/or the model hosting system 118 could also operate within a computing environment having a fewer or greater number of devices than are illustrated in FIG. 7. Thus, the depiction of the model training system 116 and/or the model hosting system 118 in FIG. 7 may be taken as illustrative and not limiting to the present disclosure. For example, the model training system 116 and/or the model hosting system 118 or various constituents thereof could implement various web services components, hosted or "cloud" computing environments, and/or peer-to-peer network configurations to implement at least a portion of the processes described herein. In some embodiments, the model training system 116 and/or the model hosting system 118 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 116. The frontend 729 processes the requests and makes sure that the requests are properly authorized. For example, the frontend 729 may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 118. The frontend 749 processes the requests and makes sure that the requests are properly authorized. For example, the frontend 749 may determine whether the user associated with a deployment request or an execution request is authorized to access the indicated model data and/or to execute the indicated machine learning model.

The training data store 760 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 760 is depicted as being located external to the model training system 116 and the model hosting system 118, this is not meant to be limiting. For example, in some embodiments not shown, the training data store 760 is located internal to at least one of the model training system 116 or the model hosting system 118.

In some embodiments, the training metrics data store 765 stores model metrics. While the training metrics data store 765 is depicted as being located external to the model training system 116 and the model hosting system 118, this is not meant to be limiting. For example, in some embodiments not shown, the training metrics data store 765 is located internal to at least one of the model training system 116 or the model hosting system 118.

The container data store 770 stores container images, such as container images used to form ML training containers 730 and/or ML scoring containers 750, that can be retrieved by various virtual machine instances 722 and/or 742. While the container data store 770 is depicted as being located external to the model training system 116 and the model hosting system 118, this is not meant to be limiting. For example, in some embodiments not shown, the container data store 770 is located internal to at least one of the model training system 116 and the model hosting system 118.

The training model data store 775 stores model data files. In some embodiments, some of the model data files are comprised of a single file, while other model data files are packages of multiple individual files. While the training model data store 775 is depicted as being located external to the model training system 116 and the model hosting system 118, this is not meant to be limiting. For example, in some embodiments not shown, the training model data store 775 is located internal to at least one of the model training system 116 or the model hosting system 118.

The model prediction data store 780 stores outputs (for example, execution results) generated by the ML scoring containers 750 in some embodiments. While the model prediction data store 780 is depicted as being located external to the model training system 116 and the model hosting system 118, this is not meant to be limiting. For example, in some embodiments not shown, the model prediction data store 780 is located internal to at least one of the model training system 116 and the model hosting system 118.

While the model training system 116, the model hosting system 118, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 107.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 116 and/or the model hosting system 118 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 116 and/or the model hosting system 118 for submitting training requests, deployment requests, and/or execution requests.

In some embodiments, the network 107 includes any wired network, wireless network, or combination thereof. For example, the network 107 may be a personal area network, local area network, wide area network, over-the-air broadcast network (for example, for radio or television), cable network, satellite network, cellular telephone network, or combination thereof. As a further example, the network 107 may be a publicly accessible network of linked networks, possibly operated by various distinct parties, such as the Internet. In some embodiments, the network 107 may be a private or semi-private network, such as a corporate or university intranet. The network 107 may include one or more wireless networks, such as a Global System for Mobile Communications (GSM) network, a Code Division Multiple Access (CDMA) network, a Long Term Evolution (LTE) network, or any other type of wireless network. The network 107 can use protocols and components for communicating via the Internet or any of the other aforementioned types of networks. For example, the protocols used by the network 107 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
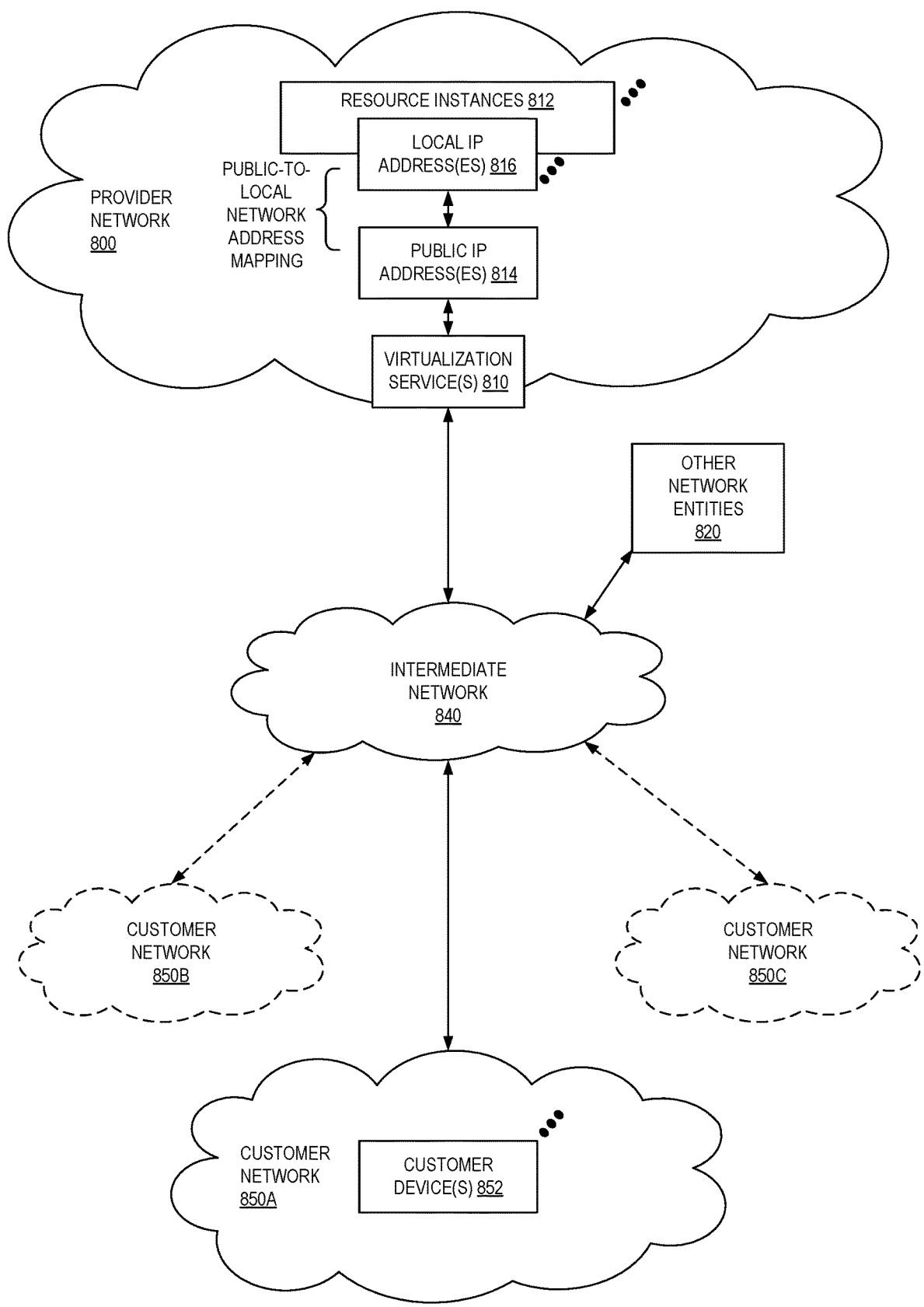
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4

(IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
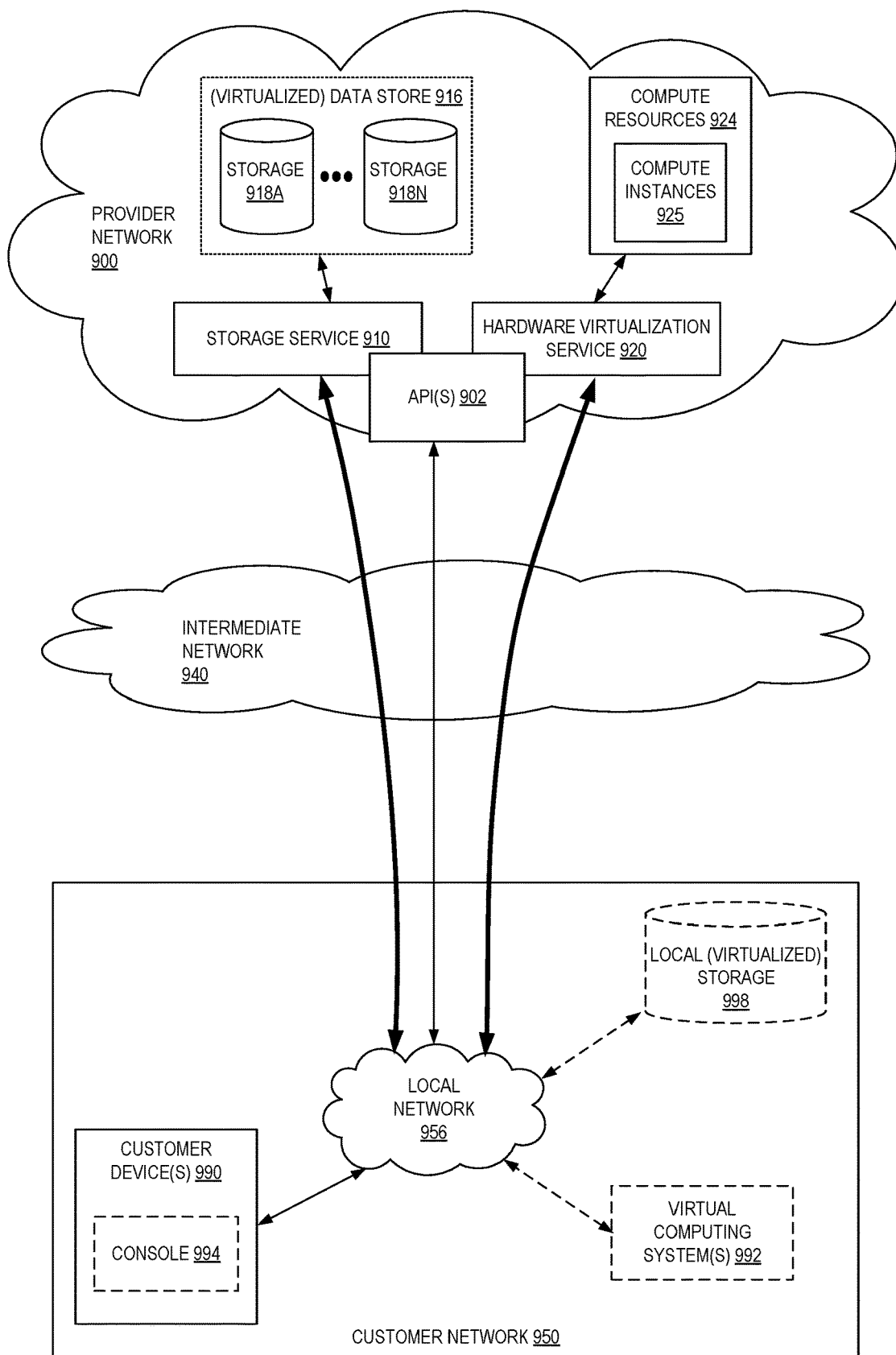
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
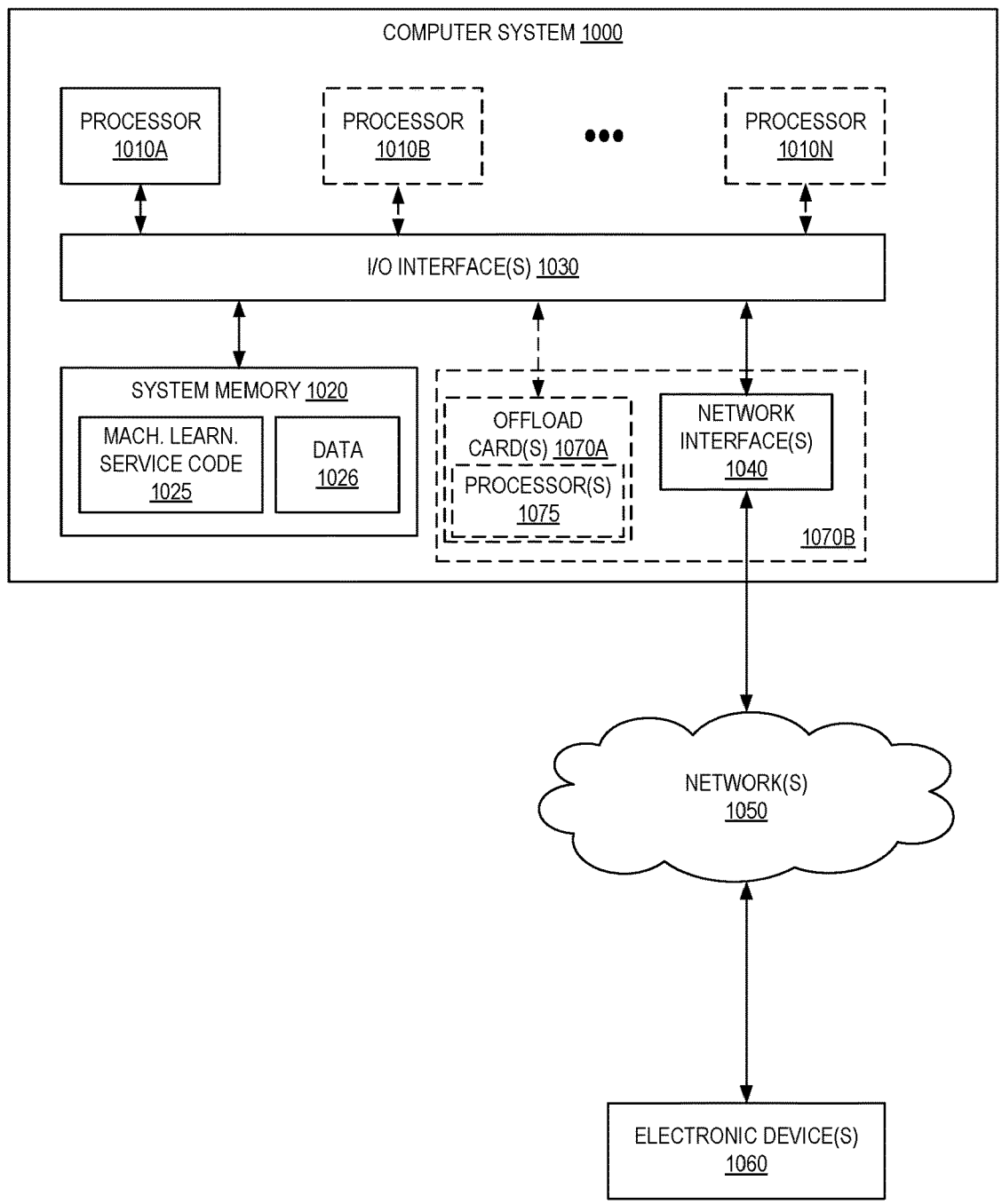
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as machine learning service code 1025 (e.g., executable to implement, in whole or in part, the machine learning service 104) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

Figure 11:
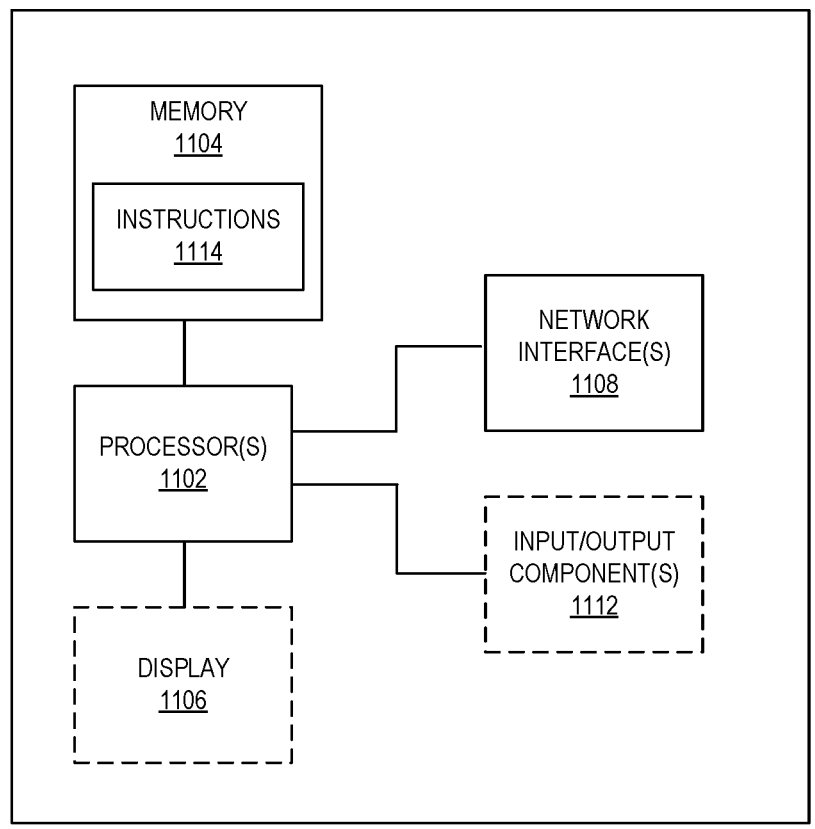
FIG. 11 illustrates a logical arrangement of a set of general components of an example computing device that can be used in accordance with various embodiments.

FIG. 11 illustrates a logical arrangement of a set of general components of an example computing device 1100 such as the computing device 128, the computing device(s) 144, etc. Generally, a computing device 1100 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1102 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1104) to store code (e.g., instructions 1114) and/or data, and a set of one or more wired or wireless network interfaces 1108 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1104) of a given electronic device typically stores code (e.g., instructions 1114) for execution on the set of one or more processors 1102 of that electronic device. One or more parts of various embodiments may be implemented using different combinations of software, firmware, and/or hardware.

A computing device 1100 can include some type of display element 1106, such as a touch screen or liquid crystal display (LCD), although many devices such as portable media players might convey information via other means, such as through audio speakers, and other types of devices such as server end stations may not have a display element 1106 at all. As discussed, some computing devices used in some embodiments include at least one input and/or output component(s) 1112 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and use a microphone, camera, sensor, etc., such that a user can control the device without having to be in physical contact with the device.

Figure 12:
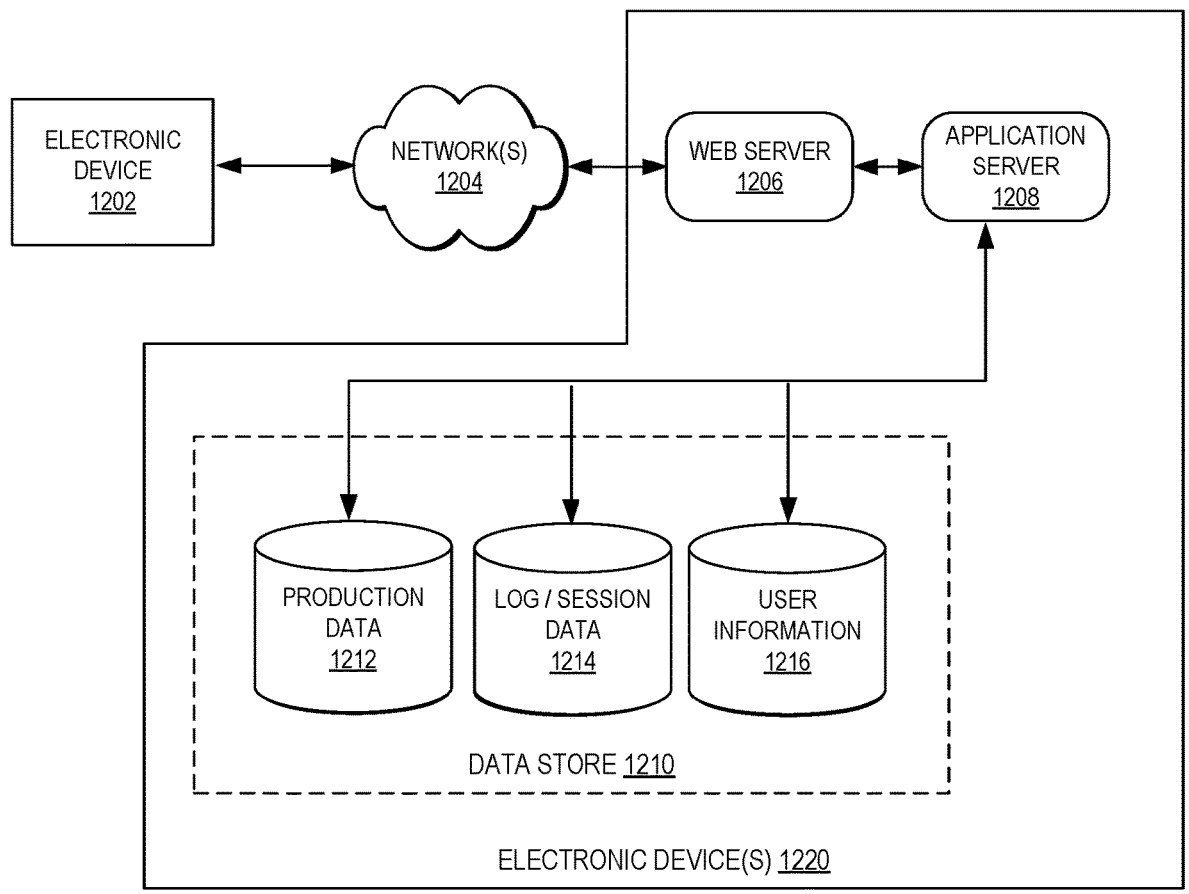
FIG. 12 illustrates an example of an environment for implementing aspects in accordance with various embodiments.

As discussed, different approaches can be implemented in various environments in accordance with the described embodiments. For example, FIG. 12 illustrates an example of an environment 1200 for implementing aspects in accordance with various embodiments. For example, in some embodiments the requests described above with reference to FIG. 1 are HyperText Transfer Protocol (HTTP) requests that are received by a web server (e.g., web server 1206), and the users, via electronic devices, may interact with the provider network via a web portal provided via the web server 1206 and application server 1208. As will be appreciated, although a web-based environment is used for purposes of explanation, different environments may be used, as appropriate, to implement various embodiments. The system includes an electronic client device 1202, which may also be referred to as a client device and can be any appropriate device operable to send and receive requests, messages or information over an appropriate network 1204 and convey information back to a user of the device 1202. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1204 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1204 includes the Internet, as the environment includes a web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device 1202 and handling a majority of the data access and business logic for an application. The application server 1208 provides access control services in cooperation with the data store 1210 and is able to generate content such as text, graphics, audio, video, etc., to be transferred to the client device 1202, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1202 and the application server 1208, can be handled by the web server 1206. It should be understood that the web server 1206 and application server 1208 are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store 1210 also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store 1210 might access the user information 1216 to verify the identity of the user and can access a production data 1212 to obtain information about items of that type. The information can then be returned to the user, such as in a listing of results on a web page that the user is able to view via a browser on the user device 1202. Information for a particular item of interest can be viewed in a dedicated page or window of the browser.

The web server 1206, application server 1208, and/or data store 1210 may be implemented by one or more electronic devices 1220, which can also be referred to as electronic server devices or server end stations and may or may not be located in different geographic locations. Each of the one or more electronic devices 1220 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment using several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the environment 1200 in FIG. 12 should be taken as being illustrative in nature and not limiting to the scope of the disclosure.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, at a machine learning (ML) service of a provider network, a first request to label objects belonging to a first object class in a first set of images;
   receiving, at the ML service, the first set of images;
   labeling, using a first ML model hosted at the ML service, objects belonging to the first object class in the first set of images;
   receiving, at the ML service, a second request to label objects belonging to a second object class;

copying, by the ML service, a proper subset of the first ML model to generate a base branch and a novel branch;

receiving, at the ML service, a second set of images including images of objects belonging to the second object class;

training, by the ML service using the second set of images, the novel branch to generate a second ML model including the base branch and the novel branch;

receiving, at the ML service, a third request to label objects belonging to the first and second object classes in a third set of images;

receiving, at the ML service, the third set of images; and labeling, using the second ML model hosted at the ML service, objects belonging to the first and second object classes in the third set of images.

2. The computer-implemented method of claim 1, wherein labeling the objects belonging to the first and second object classes in the third set of images comprises combining respective outputs of the base and novel branches of the second ML model.

3. The computer-implemented method of claim 2, wherein combining the respective outputs of the base and novel branches of the second ML model comprises combining logit scores of the base and novel branches by concatenation.

4. A computer-implemented method comprising:
receiving, at a machine learning (ML) service of a provider network, a first request to label objects belonging to a first object class;
labeling, by the ML service using a first ML model, objects belonging to the first object class in a first set of images;
receiving, at the ML service, a second request to label objects belonging to a second object class;
copying, by the ML service, a proper subset of the first ML model to generate a base branch and a novel branch;
training, by the ML service using a second set of images including images of objects belonging to the second object class, the novel branch to generate a second ML model including the base branch and the novel branch;
receiving, at the ML service, a third request to label objects belonging to the first and second object classes; and
labeling, by the ML service using the second ML model, objects belonging to the first and second object classes in a third set of images.

5. The computer-implemented method of claim 4, wherein the proper subset of the first ML model comprises an encoder with a base parameter.

6. The computer-implemented method of claim 4, wherein receiving, at the ML service, the third request to label objects belonging to the first and second object classes comprises receiving the third request at a single application programming interface (API).

7. The computer-implemented method of claim 4, wherein labeling the objects belonging to the first and second object classes in a third set of images comprises combining respective outputs of the base and novel branches of the second ML model.

8. The computer-implemented method of claim 7, wherein combining the respective outputs of the base and novel branches of the second ML model comprises combining logit scores of the base and novel branches by concatenation.

9. The computer-implemented method of claim 7, wherein combining respective outputs of the base and novel branches of the second ML model comprises knowledge pooling.

10. The computer-implemented method of claim 4, further comprising, after training the second ML model, updating an API associated with the first ML model such that the API is also associated with the second ML model.

11. The computer-implemented method of claim 4, wherein training the second ML model is performed by a model training system of the ML service, and the second ML model is subsequently exposed via an endpoint of a model hosting system of the ML service.

12. The computer-implemented method of claim 4, further comprising storing a set of labeled images including labels of the objects belonging to the first and second object classes.

13. A system comprising:
one or more electronic devices implementing a machine learning (ML) service in a multi-tenant provider network, the ML service including instructions that, when executed by one or more processors of the ML service cause the ML service to:
receive a first request to label objects belonging to a first object class;
label objects belonging to the first object class in a first set of images;
receive a second request to label objects belonging to a second object class;
copy a proper subset of the first ML model to generate a base branch and a novel branch;
train, using a second set of images including images of objects belonging to the second object class, the novel branch to generate a second ML model including the base branch and the novel branch;
receive a third request to label objects belonging to the first and second object classes; and
label, using the second ML model, objects belonging to the first and second object classes in a third set of images.

14. The system of claim 13, wherein the proper subset of the first ML model comprises an encoder with a base parameter.

15. The system of claim 13, wherein receiving the third request to label objects belonging to the first and second object classes comprises receiving the third request at a single application programming interface (API).

16. The system of claim 13, wherein labeling the objects belonging to the first and second object classes in a third set of images comprises combining respective outputs of the base and novel branches of the second ML model.

17. The system of claim 16, wherein combining the respective outputs of the base and novel branches of the second ML model comprises combining logit scores of the base and novel branches by concatenation.

18. The system of claim 16, wherein combining respective outputs of the base and novel branches of the second ML model comprises knowledge pooling.

19. The system of claim 13, wherein the instructions include further instructions that, when executed by the one or more processors of the ML service further cause the ML service to, after training the second ML model, update an API associated with the first ML model such that the API is also associated with the second ML model.

20. The system of claim 13, wherein training the second ML model is performed by a model training system of the ML service, and the second ML model is subsequently exposed via an endpoint of a model hosting system of the ML service.

* * * * *